United States Patent [19]
Muller

[11] Patent Number: 6,044,280
[45] Date of Patent: Mar. 28, 2000

[54] ARRANGEMENT IN WHICH A USEFUL SIGNAL IS TRANSMITTED BETWEEN AT LEAST TWO DEVICE UNITS

[75] Inventor: Jean-Yves Muller, Le Mans, France

[73] Assignee: U.S. Philips Corporation, New York, N.Y.

[21] Appl. No.: 09/027,601

[22] Filed: Feb. 23, 1998

[30] Foreign Application Priority Data

Feb. 28, 1997 [EP] European Pat. Off. .............. 97400473

[51] Int. Cl.[7] ...................................................... H04B 1/38
[52] U.S. Cl. ........................... 455/572; 455/575; 455/90; 455/74.1; 455/573; 455/574; 320/115
[58] Field of Search .................... 455/462, 402, 455/420, 90, 575, 561, 569, 572, 573, 574, 66, 127, 343, 74.1; 320/114, 115, 125, 112, 126, 124, 121; 307/18–22, 29, 65, 66, 38; 323/267, 223, 282, 285, 222, 235, 272, 210, 236

[56] References Cited

U.S. PATENT DOCUMENTS

| | | | |
|---|---|---|---|
| 5,444,867 | 8/1995 | Marui et al. ............................. | 455/573 |
| 5,495,530 | 2/1996 | Peterson et al. ........................ | 379/418 |
| 5,511,240 | 4/1996 | Nishiyama .............................. | 455/127 |
| 5,578,875 | 11/1996 | Dormer et al. .......................... | 307/66 |
| 5,596,626 | 1/1997 | Nakayama .............................. | 455/462 |
| 5,661,780 | 8/1997 | Yamamoto et al. .................... | 455/573 |
| 5,689,825 | 11/1997 | Averbuch et al. ...................... | 455/575 |
| 5,734,252 | 3/1998 | Griffin et al. ........................... | 320/125 |
| 5,889,381 | 3/1999 | Wakefield ................................ | 320/106 |
| 5,914,585 | 6/1999 | Grabon .................................... | 320/125 |

FOREIGN PATENT DOCUMENTS

WO9511498  4/1995  WIPO .......................... G08C 17/00

OTHER PUBLICATIONS

"Applications Handbook 1995", "Wirebound Telecom", by Philips Semiconductors.

Wally H. W. Tutlebee, "Cordless Telecommunications in Europe", Springer–Verlag London, 1990, Chapter 9, "Implementation Technology", pp. 209,210.

"Siemens Components", vol. 29, No.1/94 of Jan./Feb. 1994, pp. 18–21.

Primary Examiner—Dwayne D. Bost
Assistant Examiner—Charles Craver
Attorney, Agent, or Firm—Dicran Halajian

[57] ABSTRACT

An arrangement is described in which a useful signal is transmitted between at least two device units each having its own power supply circuit, the power supply circuit of at least one of these device units being supplied with power from a preferably electrochemical energy storage means and the power supply circuit of at least a second one of these device units being supplied with power from a power supply mains. In order to enable backup operation of the device unit or device units powered from the power supply mains in case of failure of the power supply mains, at least one of the device units powered from a power supply mains can be coupled, preferably directly, to at least one of the device units powered from an energy storage means for their common power supply from the energy storage means and/or for useful-signal transmission via coupling elements.

19 Claims, 5 Drawing Sheets

ARRANGEMENT IN WHICH A USEFUL SIGNAL IS TRANSMITTED BETWEEN AT LEAST TWO DEVICE UNITS

BACKGROUND OF THE INVENTION

1. Field of the Invention

The invention relates to an arrangement in which a useful signal is transmitted between at least two device units which each have a separate power supply circuit, the power supply circuit of at least one of said device units being powered from a, preferably electrochemical, energy storage means and the power supply circuit of at least a second one of said device units being powered from a power supply mains.

2. Description of Related Art

Such arrangements are used, for example, in electrical or electronic devices which are remote-controlled through high-frequency transmission of a useful signal and in cordless telephones. When in such an arrangement the power supply from the power supply mains is interrupted, for example as a result of a mains power failure, the device unit which is energized from this power supply mains becomes inoperative. In the example of the cordless telephone this means that operation is not possible although for the rest the device units are in working order. In this case the cordless telephone is, for example, no longer available for emergency calls. Conversely, incoming calls can neither be received. This can be particularly annoying if the failure of the power supply mains is not noticed or is not noticed in due time. Particularly in the United Kingdom it is mandatory to equip the base station of a cordless telephone with an additional battery unit which is connected to the power supply arrangement (mains supply) of the base station of the cordless telephone and which takes over the power supply in case of a mains failure. However, such a battery unit has the disadvantage that a comparatively heavy and bulky device part has to be provided for a generally short fraction of the utilization time of such a cordless telephone. The expense required for this is in conflict with the uncertainty whether at the time of a mains failure the batteries still have enough charge to allow them to actually provide the required backup power supply. This cannot be the case, for example, if it has been forgotten to insert new batteries or if in the course of time the batteries have been discharged by internal leakage currents.

SUMMARY OF THE INVENTION

It is an object of the invention to construct an arrangement of the type defined in the opening paragraph in such a manner that in case of failure of the power supply mains emergency operation of the device unit or the device units powered by the power supply mains is possible without the afore-mentioned disadvantages. According to the invention this object is achieved with an arrangement of the type defined in the opening paragraph in that at least one of the device units powered from a power supply mains can be coupled, preferably directly, to at least one of the device units powered from an energy storage means for their common power supply from the energy storage means and/or for useful-signal transmission via coupling elements. In the arrangement in accordance with the invention it is therefore no longer necessary to provide a separate backup energy storage means, for example in the form of a battery unit, for emergency operation of the device unit or device units which are energized from a power supply means. It is thus possible to make the device unit or device units energized by a power supply mains substantially smaller and to achieve a substantial cost reduction. Moreover, operating cost is saved which would otherwise be incurred for the batteries in the battery unit. As a result of this, the reliability of operation of an arrangement in accordance with the invention is improved in comparison with that of prior-art arrangements because the energy storage means in the device unit or device units powered thereby are monitored far more intensively owing to their operation.

The arrangement in accordance with the invention can be used not only for said cordless telephones but also for backup operation of a multitude of other arrangements in which a useful signal is transmitted between at least one device unit powered from an energy storage means and at least one further device unit energized from a power supply mains. The invention can also be employed if the last-mentioned device unit is energized from a further energy storage means instead of from the power supply mains, in which case backup operation of this device unit is possible from the energy storage means of the first-mentioned device unit via said coupling elements. Such backup operation is possible not only in the case of cordless telephones but also in the case of other cordless devices for transmitting useful signals, for example electronic home entertainment equipment having a remote control. With, for example, a radio receiver thus equipped a (strongly limited) emergency reception would be possible. The invention can be used particularly advantageously if the useful-signal transmission device comprises a stationary section energized from a power supply mains and a mobile section energized from an energy storage means, or comprises a plurality of mobile sections and/or stationary sections, i.e. when in order to sustain backup operation of the useful-signal transmission device at least one mobile section and at least one stationary section should remain operable at least provisionally.

The direct coupling of the device units via the coupling elements according to the invention can be used not only for the described backup operation in case of failure of a power supply mains but also for the useful-signal transmission, at option either exclusively or in addition to the power supply. To this end, the coupling elements should merely be adapted to transmit the useful signal. This requires only a minor adaptation; it possible, for example, to transfer a direct current for the power supply and an alternating current for the transmission of the useful signal via one and the same coupling element. An arrangement which has thus been adapted has the advantage that for backup operation the regular devices for the transmission of the useful signal, i.e. particularly for the cordless transmission of the useful signal, can be rendered inoperative, thereby enabling a further energy saving during backup operation to be obtained. Particularly in the case of a cordless telephone the advantage is obtained that owing to the inventive coupling of the described device units a secure useful-signal transmission is possible. This may also be desirable while the power supply mains is operational.

BRIEF DESCRIPTION OF THE DRAWING

Hereinafter, some embodiments will be described in more detail, by way of examples, with reference to the drawings. Therein, like elements bear the same reference symbols. In the drawing

DETAILED DESCRIPTION OF THE PREFERRED EMBODIMENTS

Figure 1A:
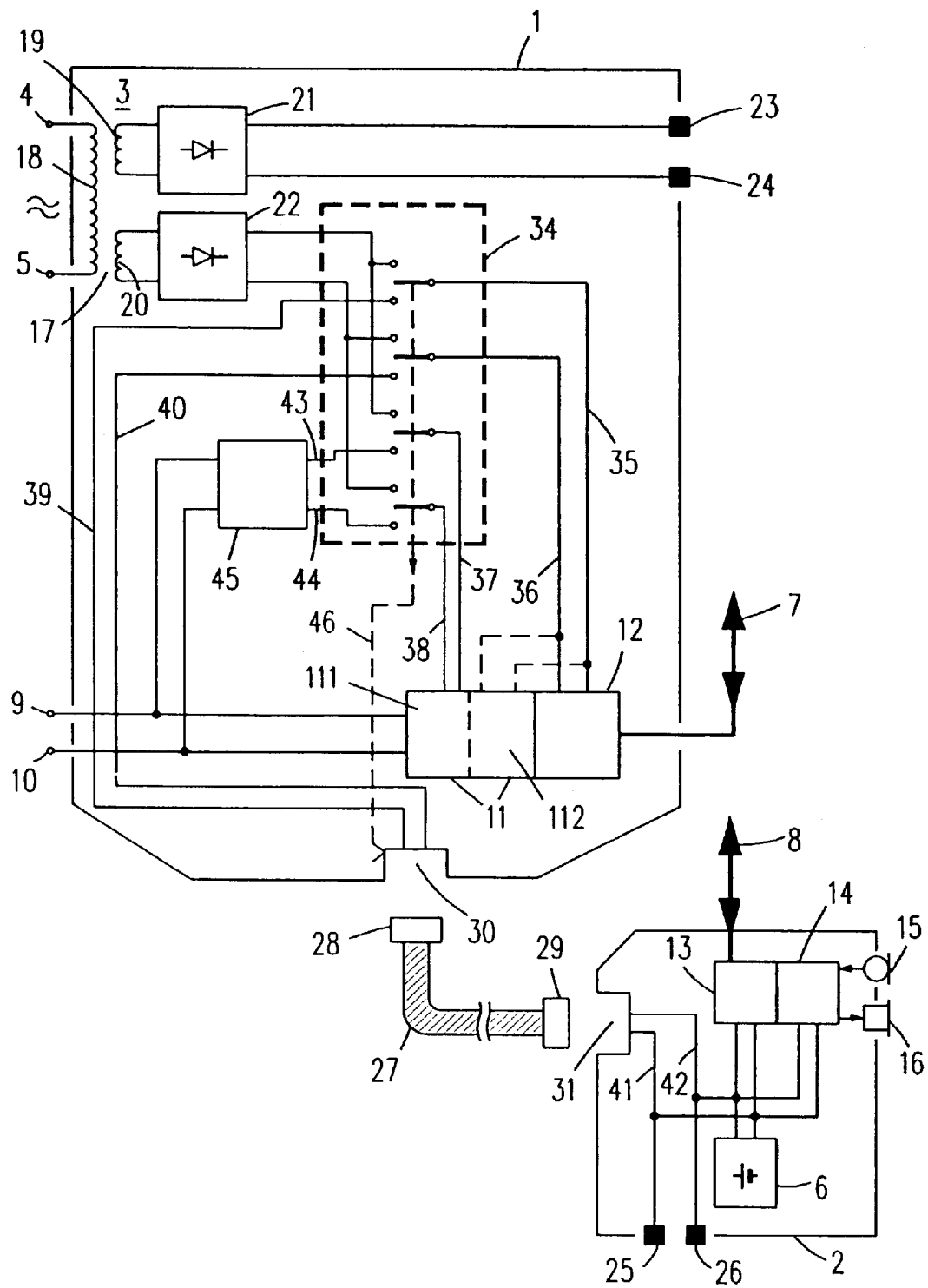
FIGS. 1A to 1D show variants of a first embodiment of an arrangement in accordance with the invention including coupling elements implemented as cables.

The embodiment of an arrangement shown in FIG. 1A, for transmitting a useful signal between device units, is a cordless telephone comprising a stationary section 1, also referred to as base station, and a mobile section 2. The stationary section 1 forms a device unit having a power supply circuit formed by a mains supply and energized from a power supply mains via terminals 4, 5. Conversely, the mobile section 2 has a power supply circuit energized by means an electrochemical energy storage means, preferably an accumulator. Between the stationary section 1 and the mobile section 2 a useful signal is transmitted, which in the present case is effected by the cordless transmission of an intelligence signal comprising a speech signal modulated on an electromagnetic wave, if desired in digitally coded form. For the transmission of this useful signal the stationary section 1 and the mobile section 2 each have an antenna 7 and 8, respectively.

The basic construction of a cordless telephone comprising at least one stationary section and at least one mobile section is known in principle and is therefore shown only very diagrammatically in FIG. 1a. By means of terminals 9, 10 the stationary section 1 is connected to a telephone network. The terminals 9, 10 lead to a module 11 comprising customary electrical or electronic circuits, as also required or provided in wirebound telephones, for the generation and/or translation of speech and dial signals. The module 11 is therefore referred to hereinafter as the dial and speech circuit. Examples for the implementation of wirebound telephones including such dial and speech circuits are described in the "Applications Handbook 1995", "Wirebound telecom" by Philips Semiconductors, herewith incorporated by reference.

The stationary section 1 further includes a useful-signal transmission stage 12 connected to the antenna 7, in which stage the speech signal supplied by the dial and speech circuit 11 is processed for transmission via the antenna 7, i.e. is encoded and/or modulated and in which, in the opposite direction, the useful signal received from the mobile section 2 via the antenna 7 is translated into a speech signal and/or dial signal, i.e. is demodulated and/or decoded, in order to apply the last-mentioned signals to the telephone network via the dial and speech circuit 11 and the terminals 9, 10.

Likewise, the mobile section 2 includes a useful-signal transmission stage 13 as well as a dial and speech circuit 14, which are both connected to the electrochemical energy storage means 6 for their power supply. The useful-signal transmission stage 13 of the mobile section 2 is connected to the antenna 8 of the mobile section 2 and serves to translate the useful signals from the stationary section 1 into speech signals or to convert speech and/or dial signals into a useful signal to be transmitted to the stationary section 1 via the antennas 8 and 7. The modulation and demodulation and, if applicable, encoding and decoding is then effected in a manner complementary to the corresponding processes in the useful-signal transmission stage 12 of the stationary section 1. In the mobile section 2 speech and/or dial signals are exchanged between the useful-signal transmission stage 13 and the dial and speech circuit 14 in a similar manner. A microphone 15 for picking up speech and an earphone 16 for speech reproduction are connected to the dial and speech circuit 14 in the mobile section 2.

The highly diagrammatic construction of a cordless telephone described hereinbefore is shown in the book "Cordless Telecommunications in Europe" by Wally H. W. Tutlebee, Springer-Verlag London, 1990, see Chapter 9, "Implementation Technology", pp. 209, 210. For circuits for cordless telephones reference is further made to the publication "Siemens Components", Volume 29, No. 1/94 of January/February 1994, pages 18 to 21.

The power supply circuit 3 of the stationary section 1 comprises a transformer 17 whose primary winding 18 is connected to the terminals 4, 5 and whose two secondary windings 19, 20 are electrically isolated from one another and are each connected to a rectifier stage 21 and 21, respectively. The first rectifier stage 21 is connected to two on-hook contacts 23, 24 on the housing of the stationary section 1.

When the mobile section 1 is placed in a corresponding receptacle on the stationary section 1 the on-hook contacts 23, 24 are directly coupled to corresponding on-hook contacts 25 and 26, respectively, on the housing of the mobile section 2. In this operating condition the electrochemical energy storage means 6 is connected to the first rectifier stage 21 via said on-hook contacts 23 to 26 for the purpose charging.

In the case of direct power supply to the stationary section 1, the dial and speech circuit 11 and the useful-signal transmission stage 12 in this section, from a power supply mains via the power supply circuit 3 and the terminals 4, 5 the dial and speech circuit 11 and the useful-signal transmission stage 12 become inoperative in the case of failure of this power supply. The connection between the terminals 9, 10 connected to the telephone network and the mobile section is then interrupted although both the telephone network and the mobile section 2 remain subsequently operable. According to invention, in order to remedy this undesirable situation, it is in principle proposed to operate the cordless telephone—or any other similarly constructed arrangement in which a useful signal is transmitted—as a wirebound telephone—or a wirebound arrangement for the transmission of a useful signal—in case of failure of the power supply to the stationary section from the power supply mains. According to the invention a cable 27 is used for this purpose in the embodiment shown in FIG. 1a, which cable forms coupling elements for the power supply. One end of this cable is connected to a socket 30 on the stationary section 1 and to a socket 31 on the mobile section 2 by means of plugs 28 and 29, respectively. Thus, the power supply from the electrochemical energy storage means 6 of the mobile section 2 is coupled to the stationary section via the sockets 30, 31, the plugs 28, 29 and the cable 27.

In accordance with the invention the stationary section 1 comprises a power-supply switching device 34, shown as a multi-pole mechanical switch in FIG. 1A, but preferably it can also take the form of an electronic switch in a manner known per se. The power-supply switching device 34 has four switching contacts which are isolated from one another, each time two of these contacts leading, respectively, to power supply lines 35, 36 of the useful-signal transmission stage 12 and 37, 38 of the dial and speech circuit 11 of the stationary section. Thus, the power supply to the dial and speech circuit 11 and that to the useful-signal transmission stage 12 can be effected isolated from one another. The four switching contacts can each be connected to a change-over contact in two switching states of the power-supply switching device 34; a change-over between the switching states consequently means that the four switching contacts are switched from one group of change-over contacts to the other group. The first group of change-over contacts, connected to the change-over contacts in a first state of the power-supply switching device 34, are coupled to terminals of the second rectifier stage 22 of the power supply circuit 3 of the stationary section 1 in such a manner that this second rectifier stage 22 energizes the dial and speech circuit 11 and the useful-signal transmission stage 12 in parallel at the same time. This first switching state corresponds to normal operation of the stationary section 1, in which—as in conventional cordless telephones—the entire stationary section is powered by the power supply mains via the terminals 4, 5.

In the second switching state of the power-supply switching device 34 the switching contacts of this device are connected to the respective lower change-over contacts. Thus, in this second switching state the second rectifier stage 22 is disconnected from the dial and speech circuit 11 and the useful-signal transmission stage 12. Instead of this, the power supply lines 35, 36 of the useful-signal transmission stage 12 are connected to the electrochemical energy storage means 6 in the mobile section 2 via the socket 30 on the stationary section 1, the cable 27 with the plugs 28, 29 and the socket 31 on the mobile section 2. The additional power supply lines provided for this purpose in accordance with the invention bear are referenced 39, 40 in the stationary section 1 and 41, 42 in the mobile section 2. Both the sockets 30, 31 and the plugs 28, 29 have corresponding connector contacts for these lines.

The switching contacts of the power-supply switching device connected to the power supply lines 37, 38 of the dial and speech circuit 11 are connected to two switching contacts connected to output terminals 43 and 44, respectively, of a special power supply circuit 45 which is supplied with power from the telephone network via the terminals 9, 10. However, it is to be noted that the permissible power drain from the telephone network is generally limited to very small values, for which reason it is common practice to power cordless telephones from the power supply mains. The power supply to the stationary section 1, on the one hand, from the telephone network—via the power supply circuit 45— and, on the other hand, from the electrochemical energy storage means 6 of the mobile section 2—via the cable 27—serves the purpose of using the power from the electrochemical energy storage means 6 as economically as possible.

Depending on the implementation of the dial and speech circuit 11 of the stationary section 1 the case may arise that its power demand exceeds the permissible power drain from the telephone network. In that case the arrangement shown in FIG. 1*a* should be modified as indicated in broken lines. The dial and speech circuit 11 is then divided into two submodules 111, 112. The first submodule 11 is the powered from the second rectifier stage 22 via the power supply lines 37, 38 in the first switching state of the power-supply switching device 34 and from the special power supply circuit 45 in the second switching state of the power-supply switching device 34. Conversely, the second submodule 112, connected to the power supply lines 35, 36 via the connections shown in broken lines, is powered from the second rectifier stage 22 in the first switching state of the power-supply switching device 34 and from the electrochemical energy storage means 6 of the mobile section 2 via the additional power supply lines 39 to 42 and the cable 27 in the second switching state of the power-supply switching device 34.

In the embodiment as shown in FIG. 1A the change-over of the power-supply switching device 34 between the first and the second switching state is effected via an actuating connection 46 connected to the socket 30 on the stationary section 1. This actuating connection switches over the power-supply switching device 34 depending on whether the plug 28 has or has not been inserted into the socket 30 on the stationary section 1. Preferably, such an actuating connection 46 can be formed mechanically by means of a jack plug or the like. In case of failure of the power supply mains the user then automatically activates the desired switching state of the power-supply switching device 34 by means of the cable connection between the stationary section 1 and the mobile section 2 (by means of the cable 27).

Figure 1B:
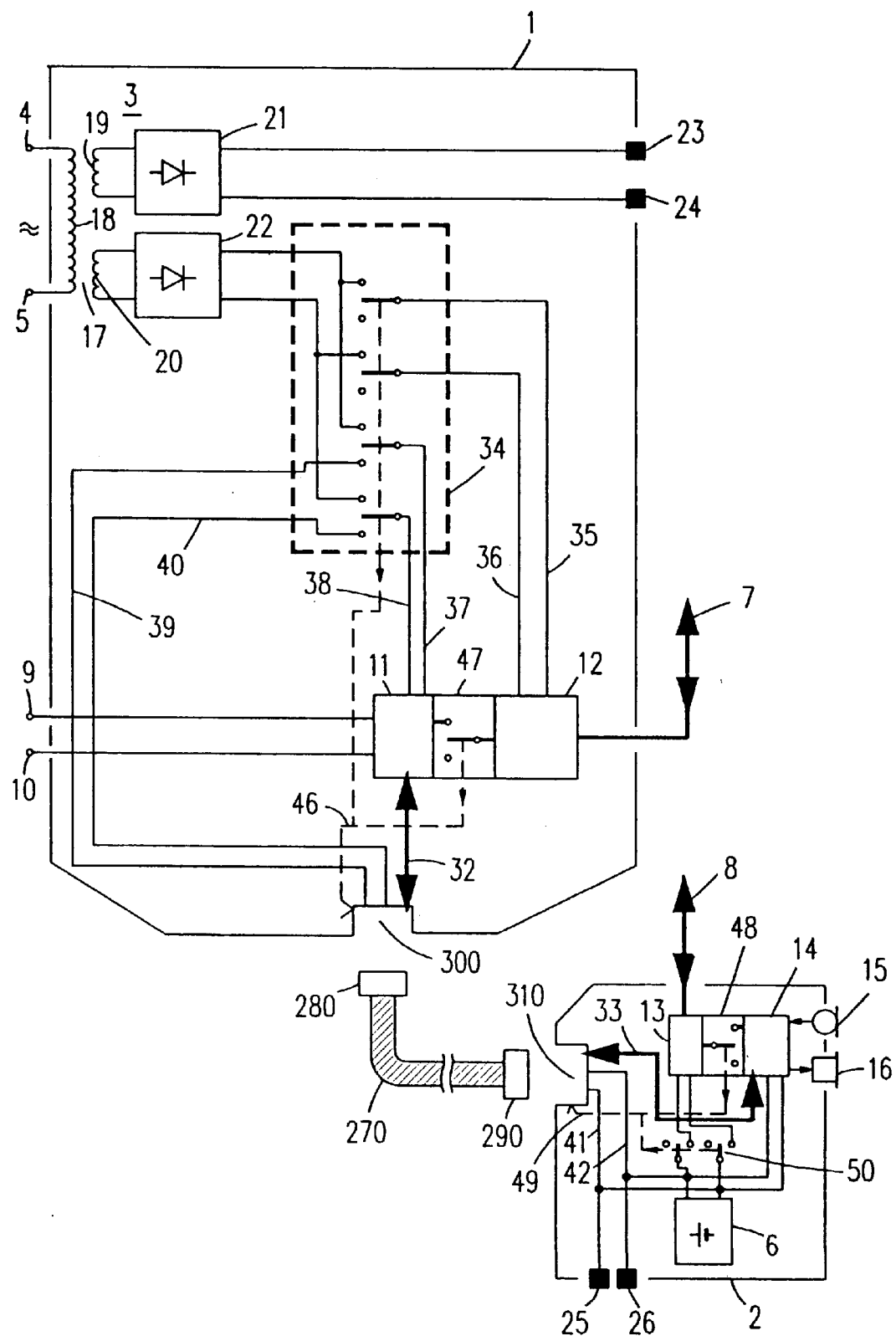

In the arrangement as shown in FIG. 1A the useful-signal transmission in both switching states of the power-supply switching device 34 via the useful-signal transmission stages 12 and 13 and the antennas 7 and 8 connected thereto. In order to achieve a further energy saving in the case of power supply from the electrochemical energy storage means 6, the arrangement shown in FIG. 1*a* can be modified so as to obtain the embodiment as shown in FIG. 1*b*. In this embodiment a (first) switching stage 47 is include between the dial and speech circuit 11 and the useful-signal transmission stage 12 of the stationary section 1; likewise, a (second) switching stage 48 is included between the useful-signal transmission stage 13 and the dial and speech circuit 14 of the mobile section. Similarly to the power-supply switching device 34, the (first) switching stage 47 of the stationary section 1 is switchable via the actuating connection 46. In its first switching state, which corresponds to the first switching state of the power-supply switching device 34, the (first) switching stage 47 forms a connection for the useful signal between the dial and speech circuit 11 and the useful-signal transmission stage 12 of the stationary section 1. In the second switching state, which corresponds to the second switching state of the power-supply switching device 34, this connection for the useful signal is interrupted.

For the transmission of the useful signal in the second switching state of the power-supply switching device 34 the stationary section 1 comprises a line 32 which leads from the dial and speech circuit 11 to a socket 300, which corresponds to the socket 30 of FIG. 1*a*, except for an additional terminal for the line 32. Likewise, the cable 27 of FIG. 1*a* has been modified to form a cable referenced 270 in FIG. 1*b* by the addition of a connection for the transmission of the useful signal. This cable 270 has correspondingly adapted plugs 280, 290. The plug 290 can be connected to a socket 310 on the mobile section 2, which socket corresponds to the socket 31 of FIG. 1*a* with an additional terminal for the useful signal. The useful signal is transferred between the socket 310 and the dial and speech circuit 14 in the mobile section via a line 33. The socket 310 on the mobile section 2 in FIG. 1*b* further comprises an actuating connection 49, which similarly to the actuating connection 46 in the stationary section 1 can be formed by means of a jack plug. By means of this actuating connection 49 the (second) switching stage 48 is switched between two switching states corresponding to those of the (first) switching stage 47 of the stationary section 1. Thus, the useful-signal transmission in the first switching state is effected via the antennas 7, and in the second switching state via the lines 32, 33 and the cable 270.

In the embodiment shown in FIG. 1*b* the power supply to the useful-signal transmission stage 12, 13 in the stationary section 1 and in the mobile section 2, respectively, is adapted to the changed path of the useful-signal transmission. In the first switching state the power supply to the power-supply switching device 34 and the switching stages 47, 48 has not changed in comparison with that in FIG. 1A. However, in the second switching state the power supply lines 35, 36 of the useful-signal transmission stage 12 in the stationary section 1 are no longer connected to the additional power supply lines 39, 40. On the contrary, the useful-signal transmission stage 12 is then isolated from the power supply. Likewise, the useful-signal transmission stage 13 in the mobile section 2 is isolated from the power supply by means of the electrochemical energy storage means 6, which is effected with the aid of an energy-storage-means switching device 50. In FIG. 1B this switching device is shown as a two-pole switch, which is also actuated via the actuating connection 49 in the mobile section 2. In its first switching state, which corresponds to the first switching state of the power-supply switching device 34, this switch forming the energy-storage-means switching device 50 connects the electrochemical energy storage means 6 to the useful-signal transmission stage 13. In the second switching state of the energy-storage-means switching device 50, which corresponds to the second switching state of the power-supply switching device 34, the useful-signal transmission stage 13 of the mobile section 2 is isolated from the electrochemical energy storage means 6.

Thus, in the embodiment shown in FIG. 1B in case of failure of the power supply mains the electrochemical energy storage means 6 should only power the dial and speech circuit 11, 14 and no longer the useful-signal transmission stages 12, 13. As a result of this, the load of the electrochemical energy storage means 6 is reduced so far that in FIG. 1*b* in the stationary section the special power supply circuit 45 for powering the dial and speech circuit 11 or at least its first submodule 111 is rendered inoperative in case of failure of the power supply mains. Instead of the output terminals 43, 44 the additional power supply lines 39, 40 are now connected to those change-over contacts of the power-supply switching device 43 which provide the connection to the power supply lines 37, 38 of the dial and speech circuit 11 of the stationary section 1 in the second switching state.

Figure 1C:
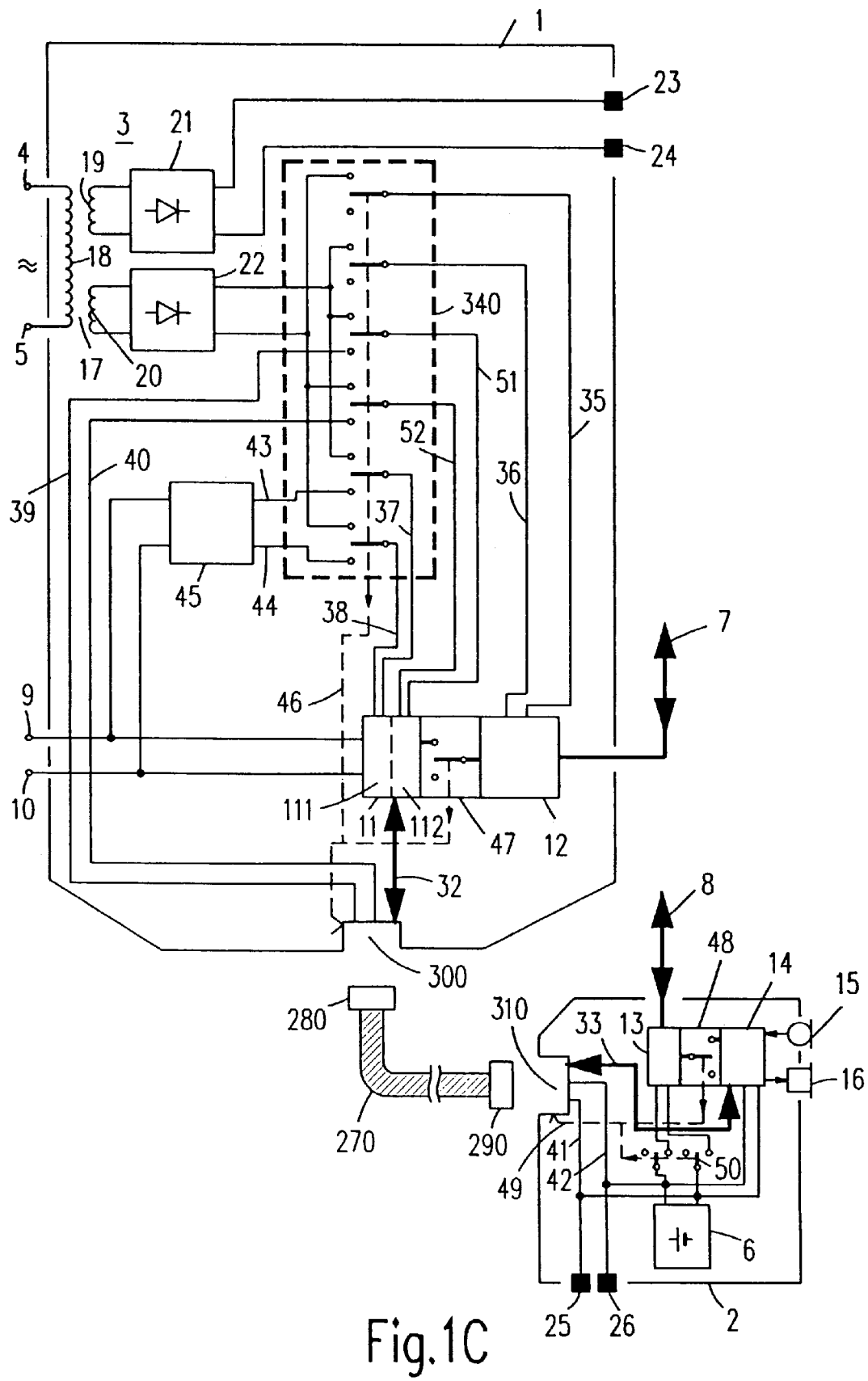

FIG. 1C shows a further embodiment, in which the power supply and the useful-signal transmission between the stationary section 1 and the mobile section 2 proceed in accordance with FIG. 1*b* but in which the power supply to the dial and speech circuit 11 of the stationary section 1 is effected in accordance with the modification shown in FIG. 1*a*, where a division into the two submodules 111, 112 has been made. For this purpose, the power supply lines 37, 38 are connected to the first submodule 111 of the dial and speech circuit 11 of the stationary section 1 and the second submodule 112 is connected to separate power supply lines 51, 52. These separate power supply lines 51, 52 are coupled to two additional switching contacts with which the power-supply switching device 34 of FIGS. 1*a* and 1*b* has been extended; this extended or modified power-supply switching device bears the reference numeral 340. In its first switching state the modified power-supply switching device 340 connects the two submodules 111, 112 of the dial and speech circuit 11 as well as the useful-signal transmission stage 12 of the stationary section 1 to the second rectifier stage 22 for the supply of energy from the power supply mains. In its second switching state the modified power-supply switching device 340 connects the first submodule 111 to the output terminal 43, 44 of the special power supply circuit 45 via the power supply lines 37, 38. In the second switching state of the modified power-supply switching device 340 the second submodule 112 is connected to the additional power supply lines 39, 40 via the separate power supply lines 51, 52 and is thus powered by the electrochemical energy storage means 6 via the cable 270. In the present case the division of the dial and speech circuit 11 of the stationary section 1 into the submodules 111, 112 is effected in such a manner that the power drained from the telephone network by the special power supply circuit 45 does not exceed the permissible value.

Figure 1D:
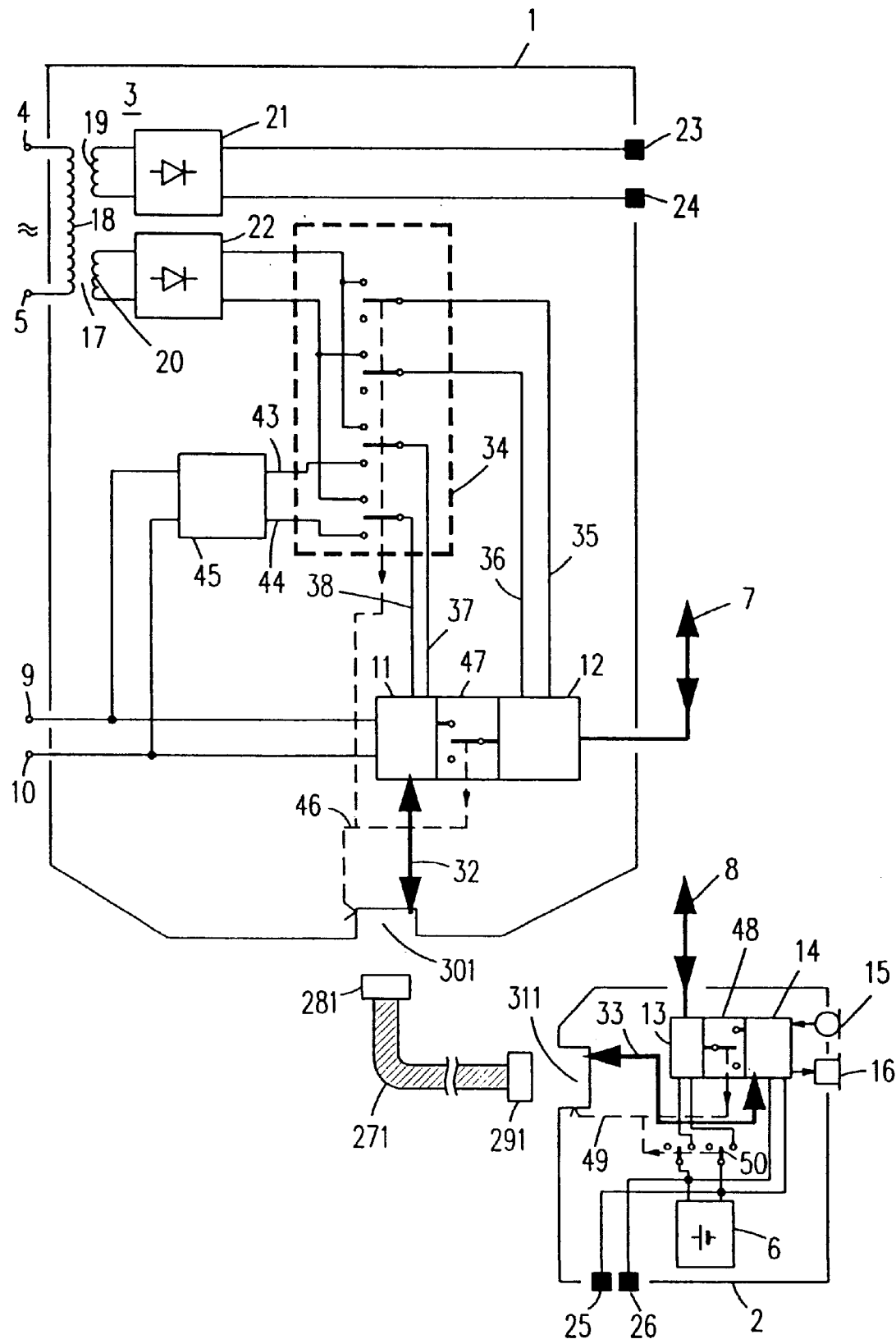

FIG. 1B shows a further modification of the described arrangement. In this embodiment a suitably modified cable 271 serves merely for transmitting the useful signal in the second switching state of the power-supply switching device 34. Accordingly, the cable 271 is connected to plugs 281 and 291, which also have only one connection for the useful signal and the corresponding sockets 301 and 311 on the stationary section 1 and the mobile section 2, respectively, also have only connections for the useful signal on the lines 32 and 33, respectively. This embodiment can be used if the dial and speech circuit 11 has such a low power consumption that it can remain wholly within the permissible power drain from the telephone network via the special power supply 45. The modification as shown in FIG. 1*d* is an embodiment which presents a particularly small load to the electrochemical energy storage means 6. In the second switching state, i.e. in case of failure of the power supply mains, the useful-signal connection via the antennas 7, 8 is simply replaced by a connection via the cable 271. This loads the electrochemical energy storage means 6 to an even smaller extent than in normal operation of the arrangement via the antennas 7, 8.

In the above embodiments in accordance with FIGS. 1A to 1D a connection between the stationary section 1 and the mobile section 2 by means of the respective cables 27, 270 and 271 is possible not only in case of failure of the power supply mains but also in each case that a more reliable, for example a more secure, useful-signal transmission via a cable connection is required.

Figure 2:
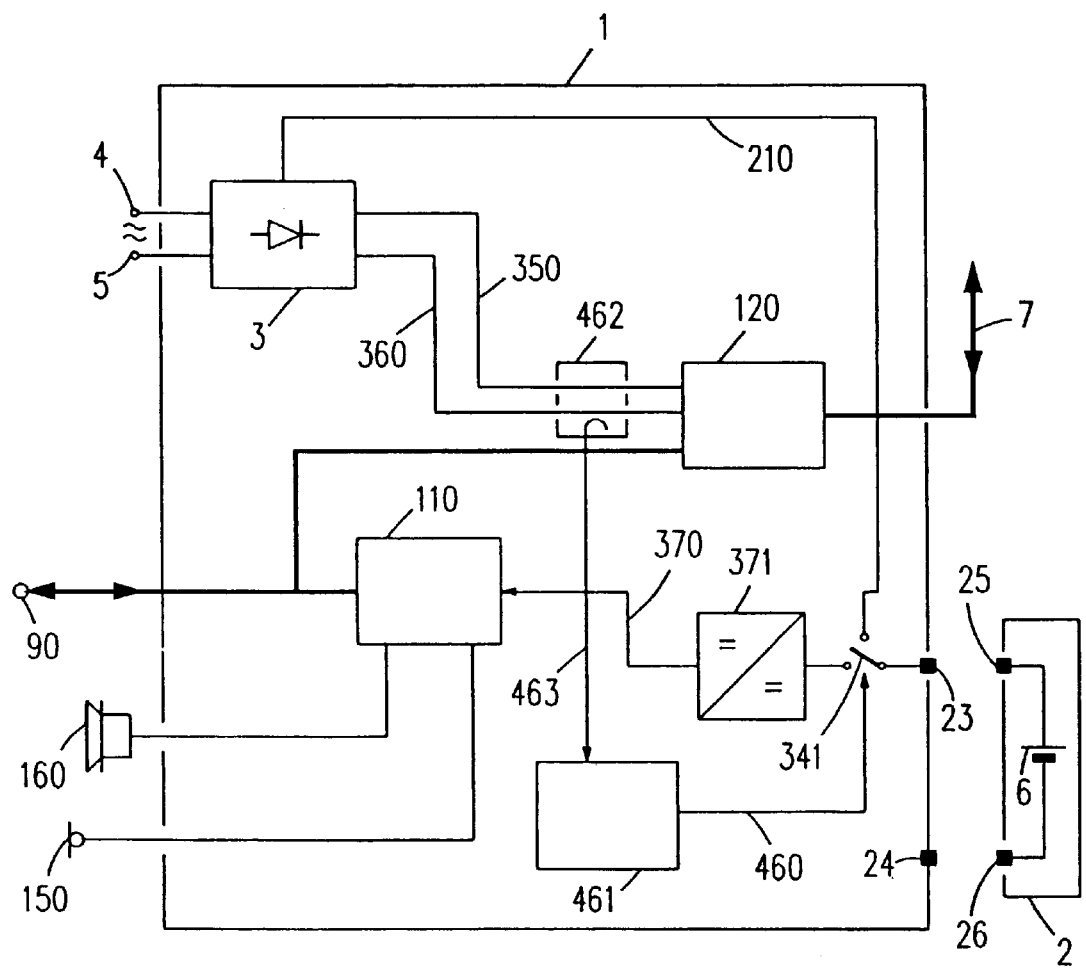
FIG. 2 is a highly diagrammatic representation of a second embodiment including coupling elements implemented as on-hook contacts.

FIG. 2 shows as a further embodiment of the arrangement in accordance with the invention a cordless telephone by means of whose stationary section 1 a telephone conversation is possible when the mobile section 2 is on-hook, i.e. when the mobile section 2 is in a position in which its electrochemical energy storage means 6 is energized, i.e. charged, via the power supply circuit 3 of the stationary section 1. For this purpose, the stationary section 1 comprises a microphone 150 and an earphone 160. These are connected to a modified dial and speech circuit 110 included in the stationary section 1 in FIG. 2. The modified dial and speech circuit 110 is connected to the telephone network by means of a terminal 90 of the stationary section 1. This terminal 90 forms a simplified representation of the terminals 9, 10 of the embodiments as shown in FIGS. 1*a* to 1*d*. Preferably, the modified dial and speech circuit 110 is constructed as a dial and speech circuit of a conventional wirebound telephone. It is powered via a power-supply line 370.

The stationary section 1 in the embodiment as shown in FIG. 2 further includes a combined module 120, which comprises a dial and speech circuit as well as a useful-signal transmission stage. The combined module 120 thus corresponds to the combination of the dial and speech circuit 11 and the useful-signal transmission stage 12 of the stationary section in the embodiment as shown in FIG. 1*a*, i.e. without the division of the dial and speech circuit 11 into the submodules 111, 112. The combined module 120 is powered from the power supply mains via the terminals 4, 5 and the power supply circuit 3 as well as the power supply lines 350, 360. The combined module 120 is connected both to the terminal 90 and to the antenna 7, in the same way as in the embodiment as shown in FIG. 1*a*.

The mobile section 2, which is not shown in detail in FIG. 2, is constructed in a manner known per se, for example as shown in FIG. 1A, but without the socket 31 and without the additional power supply lines 41, 42. As in the embodiments described hereinbefore, the on-hook contacts 25, 26 of the mobile section 2 correspond to the on-hook contacts 23, 24 of the stationary section 1. In the present case and also in prior-art cordless telephones they serve to supply power to the electrochemical energy storage means 6 of the mobile section 2 by means of the power supply circuit 3 when the mobile section 2 is "on-hook", i.e. in a position with respect to the stationary section 1, in which the on-hook contacts 23, 24 of the stationary section 1 are directly connected to the on-hook contacts 25 and 26 of the mobile section 2. In this operating condition the power supply to the power supply circuit 3 is effected via a power supply line 210, which for the sake of simplicity is shown as a single-pole line in FIG. 2. The power supply line 210 in the stationary section 1 can be connected to the on-hook contact 23 via a modified power-supply switching device 341, shown as a simple switch in FIG. 2. Similarly to the power supply line 210, the modified power-supply switching device 341 is also shown as a single-pole device for the sake of simplicity but it can also be a suitable multi-pole device, for example, for a potential-free connection of the on-hook contact 24.

The power supply line 350, 360 further includes a current or voltage sensor 462 connected to a detection stage 461 via a sensor line 463, which detection stage is coupled to the modified power-supply switching device 341 via an actuating connection 460.

In normal operation of the arrangement shown in FIG. 2 the power supply to the stationary section 1 from the power supply mains 3. The resulting power supply via the power supply lines 350, 360, i.e. the supply voltage on these lines or the corresponding current, is sensed by means of the current or voltage sensor 462 and is converted by the subsequent detection stage 461 into a control signal for the actuating connection 460. By means of the actuating connection 460 the modified power-supply switching device 341 is set to its first switching state, in which the power supply line 210 is connected to the on-hook contact 23. Thus, in this first switching state the power supply to the modified dial and speech circuit 110 via the power supply line 370 is interrupted and this circuit as well as the microphone 150 and the earphone 160 are inoperative. The useful-signal transfer is effected only from the terminal 90 to the mobile section 2 via the combined module 120 and the antenna 7.

In case of failure of the power supply mains the power supply from the power supply circuit 3 to the combined module 120 via the power supply lines 350, 360 is interrupted and this module is thus rendered inoperative. In response to this operating condition the current or voltage sensor 462 and the detection stage 461 cause the modified power-supply switching device 341 to be set to its second switching state, in which the on-hook contact 23 is connected to the power supply line 370. To adapt the supply voltages a d.c. converter 371 may be included in the power supply line 370. The modified dial and speech circuit 110 of the stationary section 1 is now connected to the electrochemical energy storage means 6 for its power supply via the on-hook contacts 23, 25 (and via 24, 25, though this is not shown explicitly), the modified power-supply switching device 341, the power supply line 370 and the d.c. converter 371. In the second switching state the modified power-supply switching device 341, i.e. in case of failure of the power supply mains, the stationary section 1 is operated as a conventional wirebound telephone and is supplied with power from the electrochemical energy storage means 6 of the mobile section 2.

In addition, the mobile section 2 of the embodiment shown in FIG. 2 may include a device for detecting the operating conditions of the mobile section. By means of this device it is possible, in particular, to detect whether the electrochemical energy storage means 6 is connected to the stationary section 1 for the power supply to this section. In this operating condition it is then possible to disconnect a useful-signal transmission stage arranged in the mobile section 2 (and corresponding to the useful-signal transmission stage 13 in FIG. 1A) as well as a dial and speech circuit (corresponding to the dial and speech circuit 14 in FIG. 1A) from the electrochemical energy storage means 6 and, as a result this, energy can be saved. Optionally, this disconnection of the dial and speech circuit and the useful-signal transmission stage of the mobile section 2 can be effected each time that the on-hook contacts of the stationary section 1 and the mobile section 2 are brought into contact with one another. This simplifies the afore-mentioned detection device in the mobile section 2. The operational condition of the power supply mains and, consequently, the power supply via the power supply lines 350, 360 then determines via the switching state of the modified power-supply switching device 341 whether in the "on-hook" condition of the mobile section 2 the electrochemical energy storage means 6 is charged by the power supply circuit 3 or is used for the power supply to the modified dial and speech circuit 110.

Independently of this, the stationary section 1 as shown in FIG. 2 can also be extended in such a manner that in the case of power supply from the power supply mains while the mobile section 2 is "on hook" the modified dial and speech circuit 110 is also powered from this power supply mains, so that in the "normal" operating condition of the arrangement operation as a conventional wirebound telephone is possible without the electrochemical energy storage means 6 being loaded. This possibility is used, for example, for hands-free devices.

I claim:

1. An arrangement in which a useful signal is transmitted between at least two device units which each have a separate power supply circuit, the power supply circuit of at least one of said device units being powered from an energy storage means and the power supply circuit of at least a second one of said device units being powered from a power supply mains, characterized in that at least one of the device units powered from a power supply mains can be coupled to at least one of the device units powered from an energy storage means for their common power supply from the energy storage means and can be coupled for useful-signal transmission between them via coupling elements in which the at least one of said device units powered from an energy storage means is formed by a mobile section of a cordless useful signal transmission device and the at least one of said device units powered form a power supply mains forms a stationary section of the cordless useful signal transmission device.

2. An arrangement as claimed in claim 1, characterized in that the cordless useful-signal transmission device is a cordless telephone.

3. An arrangement as claimed in claim 2, characterized in that at least one of the device units powered from a power supply mains is coupled to receive power supply from at least one of the device units powered from an energy storage means via the coupling elements in case of failure of the power supply mains.

4. An arrangement as claimed in claim 3, having at least one device unit powered from a power supply mains connected to a telephone network, characterized in that the power supply (power supplies) of said device unit(s) is (are) formed in such a manner that at least a part of those elements of said device units which are adapted to process and/or transmit useful signals are selectively supplied with power from the telephone network.

5. An arrangement as claimed in claim 3, characterized in that the coupling elements are formed by means of cables.

6. An arrangement as claimed in claim 3, characterized in that the coupling elements are formed by means of on-hook contacts.

7. An arrangement as claimed in claim 3, characterized in that the device units powered from a power supply mains each include power-supply switching device for switching over from their own power supply circuits to that one of the device units which is powered from an energy storage means and which is to be coupled to them.

8. An arrangement as claimed in claim 2, characterized in that the device units each include a useful-signal switching device for switching the useful-signal transmission to the coupling elements.

9. An arrangement as claimed in claim 1, characterized in that at least one of the device units powered from a power supply mains is coupled to receive power supply from at least one of the device units powered from an energy storage means via the coupling elements in case of failure of the power supply mains.

10. An arrangement as claimed in claim 9, characterized in that the coupling elements are formed by means of cables.

11. An arrangement as claimed in claim 9, characterized in that the coupling elements are formed by means of on-hook contacts.

12. An arrangement as claimed in claim 9, characterized in that the device units powered from a power supply mains each include power-supply switching device for switching over from their own power supply circuits to that one of the device units which is powered from an energy storage means and which is to be coupled to them.

13. An arrangement as claimed in claim 12, characterized in that the power-supply and/or useful-signal switching device(s) is (are) adapted to effect automatic switching over when said coupling between two device units is made.

14. An arrangement as claimed in claim 1, characterized in that the device units each include a useful-signal switching device for switching the useful-signal transmission to the coupling elements.

15. An arrangement as claimed in claim 1, characterized in that at least one of the device units powered from a power supply mains is coupled to receive power supply from at least one of the device units powered from an energy storage means via the coupling elements in case of failure of the power supply mains.

16. An arrangement as claimed in claim 15, characterized in that the coupling elements are formed by means of cables.

17. An arrangement as claimed in claim 15, characterized in that the coupling elements are formed by means of on-hook contacts.

18. An arrangement as claimed in claim 15, characterized in that the device units powered from a power supply mains each include power-supply switching device for switching over from their own power supply circuits to that one of the device units which is powered from an energy storage means and which is to be coupled to them.

19. An arrangement as claimed in claim 1, characterized in that the device units each include a useful-signal switching device for switching the useful-signal transmission to the coupling elements.

* * * * *